(12) United States Patent
Kirkpatrick et al.

(10) Patent No.: US 9,248,587 B2
(45) Date of Patent: Feb. 2, 2016

(54) APPARATUS FOR MANUFACTURING A FLANGED COMPOSITE COMPONENT AND METHODS OF MANUFACTURING THE SAME

(75) Inventors: Bowden Kirkpatrick, Niskayuna, NY (US); Mark Ernest Vermilyea, Niskayuna, NY (US); Derrick Wayne Lamm, Baltimore, MD (US); Melissa Ann Marie Bramell, Baltimore, MD (US); David Louis Callahan, Severna Park, MD (US); Jason Michael Seabrease, Middle River, MD (US)

(73) Assignee: General Electric Company, Niskayuna, NY (US)

( * ) Notice: Subject to any disclaimer, the term of this patent is extended or adjusted under 35 U.S.C. 154(b) by 706 days.

(21) Appl. No.: 13/542,237

(22) Filed: Jul. 5, 2012

(65) Prior Publication Data

US 2014/0010986 A1    Jan. 9, 2014

(51) Int. Cl.
*B29C 33/50* (2006.01)
*B29C 57/00* (2006.01)
(Continued)

(52) U.S. Cl.
CPC ............... *B29C 33/505* (2013.01); *B29C 57/00* (2013.01); *B29C 70/222* (2013.01); *B29C 70/44* (2013.01);
(Continued)

(58) Field of Classification Search
CPC ........ B29C 57/00; B29C 57/02; B29C 57/04; B29C 33/505; B29C 67/0025; B29C 57/08; B29C 70/766; B29C 70/446; B21D 39/00; B21D 39/08; B21D 39/20; B21D 39/203; B21D 41/02; Y10T 29/49801; Y10T 29/49805

USPC ......... 264/516, 520, 521, 523, 529, 259, 260, 264/573; 285/21.1, 285.11, 286.2, 290.1, 285/290.3, 382, 382.1, 382.4, 382.7, 405
See application file for complete search history.

(56) References Cited

U.S. PATENT DOCUMENTS 2,142,150 A * 1/1939 Replogle .................. 264/342 R
2,465,144 A * 3/1949 Wyatt ............................. 29/816
(Continued)

FOREIGN PATENT DOCUMENTS

EP    1170117 A1    1/2002
EP    1859958 B1    11/2007
(Continued)

OTHER PUBLICATIONS

Oosthuizen et al., "Post-cure shrinkage in hubbed full face flange," Proceedings of the 13th Annual Technical Conference on Composite Materials, Sep. 21-23, 1998, Baltimore MD (10 pgs).
(Continued)

*Primary Examiner* — Christopher M Koehler
(74) *Attorney, Agent, or Firm* — John P. Darling (57) ABSTRACT

A method of manufacturing a flanged composite component is provided. The method includes coupling a composite structure to s first composite material. The method includes coupling a second composite material to the composite structure and placing a first expansion device within the composite structure. A forming element is coupled to at least one of the first composite material, the composite structure, and the second composite material against the mold. The method includes coupling a pressure element to the forming element to define a space among the mold, the forming element, and the pressure element. The method includes expanding the first expansion device to impart a force to the second composite material to move the second composite material away from the composite structure and into the space to facilitate forming a first flange.

20 Claims, 8 Drawing Sheets

(51) Int. Cl.
*B29C 70/44* (2006.01)
*B29C 70/22* (2006.01)
*B29C 67/00* (2006.01)
*B29C 70/76* (2006.01)
*F01D 25/24* (2006.01)

(52) U.S. Cl.
CPC .......... *B29C 67/0025* (2013.01); *B29C 70/766* (2013.01); *F01D 25/243* (2013.01); *F05D 2300/603* (2013.01)

(56) References Cited

U.S. PATENT DOCUMENTS

| | | | | |
|---|---|---|---|---|
| 3,002,871 | A | * | 10/1961 | Schaub et al. ............... 156/73.2 |
| 3,651,661 | A | * | 3/1972 | Darrow ........................ 464/181 |
| 4,065,339 | A | * | 12/1977 | Lippert et al. ................ 156/149 |
| 4,385,644 | A | * | 5/1983 | Kaempen ..................... 138/109 |
| 4,549,919 | A | * | 10/1985 | Auberon et al. ............. 156/172 |
| 4,706,364 | A | * | 11/1987 | Aubry ............................. 29/458 |
| 4,813,457 | A | * | 3/1989 | Offringa et al. .............. 138/109 |
| 4,842,670 | A | | 6/1989 | Callis et al. |
| 5,041,318 | A | | 8/1991 | Hulls |
| 5,318,647 | A | * | 6/1994 | Mitchell ....................... 156/216 |
| 5,352,309 | A | * | 10/1994 | Oswald ......................... 156/154 |
| 5,648,109 | A | * | 7/1997 | Gutowski et al. ............. 425/504 |
| 6,361,080 | B1 | * | 3/2002 | Walsh et al. ..................... 285/55 |
| 6,743,504 | B1 | | 6/2004 | Allen et al. |
| 7,935,289 | B2 | | 5/2011 | Anderson et al. |
| 8,714,601 | B2 | * | 5/2014 | Kawamata ................. 285/382.5 |
| 2004/0051305 | A1 | * | 3/2004 | Kertesz ........................ 285/21.1 |
| 2006/0244261 | A1 | * | 11/2006 | Shah et al. .................... 285/382 |
| 2007/0011987 | A1 | | 1/2007 | McAleenan et al. |
| 2008/0012329 | A1 | * | 1/2008 | Dewhirst ...................... 285/382 |
| 2008/0064511 | A1 | * | 3/2008 | Brace et al. ................... 464/181 |
| 2008/0257604 | A1 | * | 10/2008 | Becker et al. ................... 175/62 |
| 2009/0098337 | A1 | | 4/2009 | Xie et al. |
| 2009/0200700 | A1 | * | 8/2009 | Marlin et al. ................. 264/241 |
| 2009/0272165 | A1 | * | 11/2009 | Golovashchenko ............. 72/55 |
| 2009/0308477 | A1 | | 12/2009 | Geislinger et al. |
| 2010/0207304 | A1 | | 8/2010 | Kirkpatrick |
| 2011/0089750 | A1 | | 4/2011 | Colegrove et al. |
| 2011/0226407 | A1 | | 9/2011 | Imparato et al. |
| 2011/0254267 | A1 | * | 10/2011 | Marengo ....................... 285/405 |
| 2012/0034076 | A1 | | 2/2012 | Xie |

FOREIGN PATENT DOCUMENTS

| | | |
|---|---|---|
| EP | 2077183 A1 | 7/2009 |
| EP | 2434105 A2 | 3/2012 |
| WO | 2008149079 A2 | 12/2008 |

OTHER PUBLICATIONS

Bernetich et al., "Continuous improvement—application of six sigma methodology to composite parts fabrication," International SAMPE Technical Conference, vol. 2005 (7 pgs).

Panigrahi et al., "Development of Load Coupler Profiles of Spar Wingskin Joints with Improved Performance for Integral Structural Construction of Aircraft Wings," Journal of Reinforced Plastics and Composites, vol. 28, No. 6, Mar. 2009 pp. 657-673.

Niu, "Practical Design Information and Data", Composite Airframe Structures, pp. 59-60, 195-196, 434-437, Jan. 1, 2000.

European Search Report and Written Opinion issued in connection with corresponding EP Application No. 13174683.6-1706 dated Aug. 5, 2015.

\* cited by examiner

APPARATUS FOR MANUFACTURING A FLANGED COMPOSITE COMPONENT AND METHODS OF MANUFACTURING THE SAME

BACKGROUND OF THE INVENTION

The embodiments described herein relate generally to an apparatus for manufacturing a component, and more particularly, to methods and systems for manufacturing a flanged composite components.

Components often have flanges to increase the stiffness thereof and/or to facilitate assembly with other parts. Some conventional processes have been implemented to form flanges on components. In some known processes, flanges include separate metallic pieces that are bolted in position.

Composite components have been used in a variety of fields, such as the aerospace industry. Some processes deposit composite materials in a cylindrical configuration to form tubular composite components. However, current processes for forming flanges on composite components are labor intensive, and the quality of the flanges can be operator-dependent. Conventionally, operators sequentially stack composite materials in the flanged configuration by hand, which can be a slower process than laying up in the cylindrical configuration.

Moreover, it can be slow and difficult to lay up flanges from composite materials automatically or semi-automatically due to inherent machine limitations such as roller dimensions, the complexity of the motions and the intricacy of the manipulation during material placement of composite materials. More particularly, difficulties are encountered during use of current machines and tools to fabricate small bends or angles within the composite materials. Known machines and tools can be limited to fabricating flanges having large fillet bends, commonly 10 inches or larger for the bend radii of flanges, which can be impractical for some applications.

BRIEF DESCRIPTION OF THE INVENTION

In one aspect, a method of manufacturing a flanged composite component is provided. The method includes coupling a composite structure to a first composite material. The method includes coupling a second composite material to the composite structure and placing a first expansion device within the composite structure. A forming element is coupled to at least one of the first composite material, the composite structure, and the second composite material against the mold. The method includes coupling a pressure element to the forming element to define a space among the mold, the forming element, and the pressure element. The method includes expanding the first expansion device to impart a force to the second composite material to move the second composite material away from the composite structure and into the space to facilitate forming a first flange.

In another aspect, a composite component is provided. The composite component includes a first composite material and a composite structure coupled to the first composite material. A second composite material is coupled to the composite structure. The second composite material includes a flange integrally coupled to the composite structure and is positioned substantially orthogonal with respect to the composite structure. The flange includes an interface having a bend radius that is less than about 10 inches.

In yet another aspect, an apparatus for manufacturing a flanged composite component is provided. The apparatus includes a mold configured to couple to a composite material and includes a forming element coupled to the mold. A pressure element is coupled to the forming element to define a space among the mold, the forming element, and the pressure element. The apparatus includes a expansion device coupled to the mold and disposed within the space, wherein the expansion device is configured to impart a forming force to the forming element and the pressure element. A positioner is disposed within the composite material and in contact with the expansion device and configured to facilitate positioning the expansion device within the space.

DETAILED DESCRIPTION OF THE INVENTION

Figure 1:
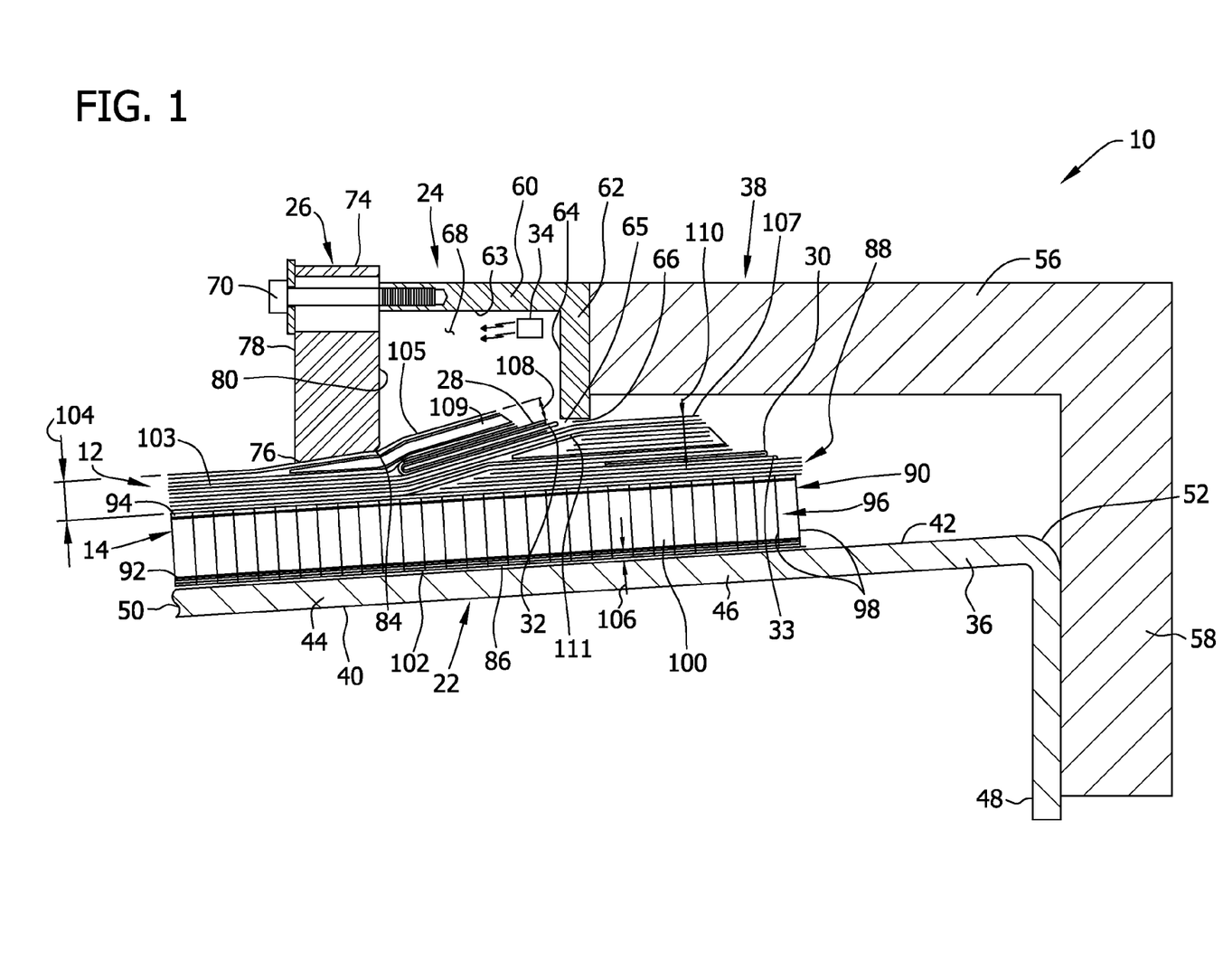
FIG. 1 illustrates a side cross sectional view of an exemplary component forming apparatus having a mold, a forming element, a pressure element, and an expansion device, and illustrates a composite material coupled to the mold.
Figure 2:
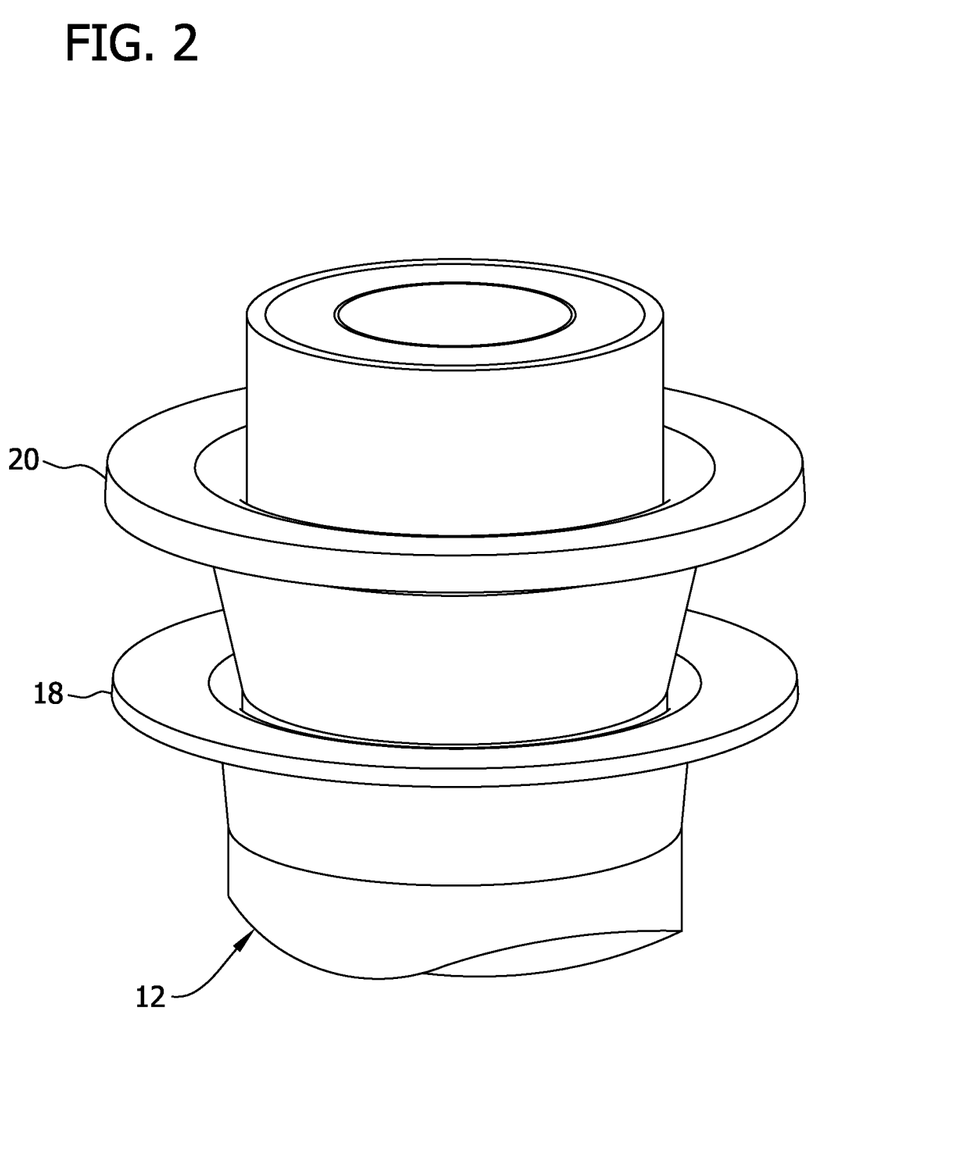
FIG. 2 illustrates a front perspective view of a flanged component formed by the exemplary apparatus shown in FIG. 1.

FIG. 1 illustrates a side cross sectional view of an exemplary component forming apparatus 10. FIG. 2 illustrates a front perspective view of a flanged component 12 formed by apparatus 10 shown in FIG. 1. Component 12 includes a composite material 14 having a first flange 18 and a second flange 20. Alternatively, fewer than two flanges or more than two flanges can be used to enable component 12 to function as described herein. Flanges 18, 20 are formed from and integrally coupled to composite material 14 (shown in FIG. 1).

In one embodiment, apparatus 10 includes a mold 22, a forming element 24, a pressure element 26, a first expansion device 28, and a second expansion device 30. Moreover, apparatus 10 includes a first positioner element 32 that is coupled to first expansion device 28 and a second positioner 33 that is coupled to second expansion device 30 and includes a temperature control device 34 which is configured to heat a space 68 and composite material 14 having a thickness 108.

Mold 22 includes a mandrel 36 and a support element 38. Mandrel 36 is configured to support composite material 14 and support element 38 is configured to support mandrel 36 during component formation as will be discussed. In one embodiment, mandrel 36 and support element 38 are annular shaped and are formed from a variety of materials such as, but not limited to, metals and metal alloys having predetermined stiffnesses. Alternatively, mandrel 36 and support element 38 can have any shape and material composition that enables apparatus 10 to function as described herein.

In one embodiment, mandrel 36 includes a first side 40, a second side 42, and a surface 44 between first and second sides 40 and 42. Mandrel 36 further includes a first portion 46 and second portion 48 which are positioned substantially orthogonal with respect to each other. Moreover, first portion 46 includes a first end 50 and a second end 52. First end 50 is angled with respect to second end 52. Temperature control device 34 is configured to apply heat to space 68 and to heat composite material 14 having thickness 108 and/or to remove heat from composite material 14. In one embodiment, temperature control device 34 is configured to direct heated forced air onto composite material 14. Alternatively, any type of temperature control device can be used to heat and/or cool to enable apparatus 10 to function as described herein.

Support element 38 includes a first portion 56 and a second portion 58. Second portion 58 is coupled to mandrel second portion 48 and extends beyond mandrel second portion 48 such that support element 38 is configured to react to forming forces generated during component formation. In one embodiment, support element 38 includes an annular ring shape. Alternatively, support element 38 may include a disk shape. Support element 38 may have any shape that enables apparatus 10 to function as described herein.

Forming element 24 is configured to contain at least one first and second expansion devices 28 and 30 during component formation. Forming element 24 includes a first portion 60 and a second portion 62 which are positioned substantially orthogonal with respect to each other. Each portion 60 and 62 has a respective side 63 and 64 orientated toward mandrel 36. In one embodiment, first portion 60 is coupled to pressure element 26 and second portion 62 is coupled to support element 38. Second portion 62 includes a bottom 65 that is spaced away from mandrel 36 to define an opening 66 between second portion 62 and mandrel 36. In addition, space 68 is defined by at least mold 22, forming element 24, and pressure element 26.

Pressure element 26 is coupled to forming element 24 and configured to apply pressure to at least one of first and second expansion devices 28 and 30 during component formation. More particularly, in an embodiment, pressure element 26 is adjustably coupled to forming element 24 by a fastener 70. In one embodiment, fastener 70 includes an adjustable screw. Alternatively, any adjusting mechanism that enables pressure element 26 to couple to forming element 24 can be used that enables apparatus 10 to function as described.

Pressure element 26 includes a top 74, a bottom 76, a first side 78, and a second side 80. Pressure element 26 further includes a curvilinear end 84 between bottom 76 and second side 80. In one embodiment, curvilinear end 84 is configured as a convex curve to facilitate curving outward towards space 68. Further, in one embodiment, curvilinear end 84 includes a bend radius that is less than about 10 inches. Alternatively, curvilinear end 84 may include a bend radius that is more than about 10 inches. Moreover, in one embodiment, curvilinear end 84 includes a bend radius that is between about 1 inch and about 5 inches. Further, in one embodiment, curvilinear end 84 includes a bend radius that is less than about 1 inch.

Each expansion device 28 and 30 includes a flexible material such as, but not limited to, butyl materials, silicone rubber, fluoro-elastomers, and nylon bagging films. In an embodiment, expansion devices 28 and 30 include a bladder. Moreover, expansion devices 28 and 30 include a valve (not shown) that is configured to pass a substance (not shown) into expansion devices 28 and 30 for inflation. The valve is coupled to a source (not shown) to facilitate delivering substance into expansion devices 28 and 30. The substance may include a compressible and/or incompressible fluid such as, for example, air or water. Moreover, positioner 32 is in contact with first expansion device 28 and second positioner 33 is in contact with second expansion device 30. First positioner 32 is configured to facilitate positioning first expansion device 28 during component formation and second positioner 33 is configured to facilitate positioning second expansion device 30 during component formation.

Composite material 14 is coupled to mandrel 36. Composite material 14 includes a material having two or more constituent materials with different physical and/or chemical properties. In one embodiment, composite material 14 includes a matrix material (not shown) and a reinforcement material (not shown). The matrix material surrounds and supports the reinforcement material, and may include metal and/or non-metal materials. Non-metal material includes materials such as, but not limited to, polyester resin, acrylic resin, vinyl ester resin, epoxy resin, polyurethane resin, phenolic resin, polyamide resin, and mixtures thereof. The reinforcement material imparts mechanical and physical properties to enhance the matrix material properties. Reinforcement material includes structures such as, for example, fibers or plies. Fiber includes material such as, but not limited to, glass fiber, graphite fiber, carbon fiber, ceramic fiber, aromatic polyamide fiber, and mixtures thereof. One or more fibers may be pre-impregnated with the one or more resins prior to be deposited or placed on mandrel 36.

Composite material 14 includes a first composite material 86, a second composite material 88, and a composite structure 90. Composite structure 90 is coupled to first composite material 86 and to second composite material 88. In one embodiment, composite structure 90 includes a first layer of fibers 92, a second layer of fibers 94, and a honeycomb structure 96. Honeycomb structure 96 is coupled to and positioned between first and second fiber layers 92 and 94. Honeycomb structure 96 includes a plurality of walls 98 defining cells 100 within structure 96. In one embodiment, composite structure 90 is coupled to first composite material 86 by interweaving first composite material 86 with first layer of fibers 92. Moreover, composite structure 90 is coupled to second composite material 88 by interweaving second composite material 88 with second layer of fibers 94. Alternatively, any coupling mechanism can be used to join composite structure 90 to first and second composite materials 86 and 88.

First composite material 86 includes a plurality of fibers 102 and second composite material 88 includes a plurality of fibers 103. In one embodiment, fibers 102 and 103 include the same material composition. Alternatively, fibers 102 of first composite material 86 can have a different material composition than fibers 103 of second composite material 88. In one embodiment, second composite material 88 includes a higher number of fibers 103 and a greater thickness 104 than a number of fibers 102 and a thickness 106 of first composite material 86. Thicknesses 104 and 106 of first composite material 86 and second composite material 88 are varied to produce components 14 having varied physical properties. Alternatively, the number of fibers 102 and thickness 106 of first composite material 86 can be the same as or greater than the number of fibers 103 and thickness 106 of second composite material 88.

In one embodiment, first composite material 86 is coupled to mandrel second side 42. First composite material 86 may be deposited on second side 42 using any variety of techniques (not shown) such as, for example, tape placement, fiber placement, and/or hand or automatic lay up. Composite structure 90 is configured to extend away from mandrel 36 and towards space 68. Moreover, second composite material 88 is deposited between forming element 24 and mandrel 36 and between pressure element 26 and mandrel 36.

Expansion devices 28 and 30 are inserted within fibers 103 and first and second positioners 32 and 33 are positioned within a portion of fibers 103. First expansion device 28 is positioned within second composite material 88 such that thickness 108 of fibers 103 between first expansion device 28 and a top layer 105 of fibers 103 is less than a thickness 110 of fibers 103 between second expansion device 30 and a top layer 107 of fibers 103. Thicknesses 108 and 110 of fibers 103 are varied to produce flanges 18 and 20 having varied sizes. Alternatively, thicknesses 108 and 110 of fibers 103 can be substantially the same to produce flanges 18 and 20 with similar sizes. First expansion device 28, in a deflated state, is configured to position a first portion 109 of fibers 103 of second composite material 88 into space 68 and toward curvilinear end 84 of pressure element 26. Second expansion device 30, in a deflated state, is configured to position a second portion 111 of fibers 103 of second composite material 88 within opening 66 and towards second portion 62 of forming element 24.

Figure 3:
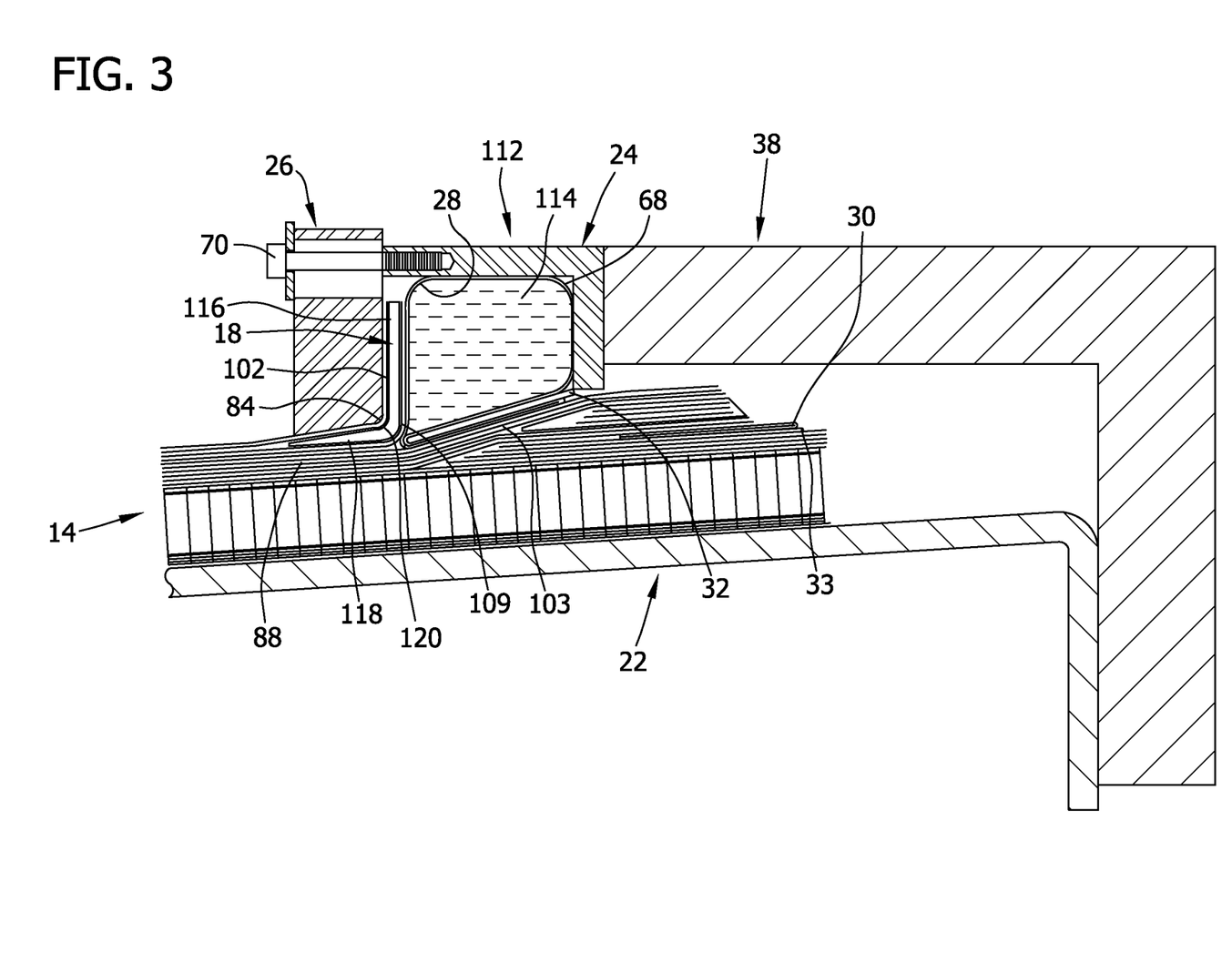
FIG. 3 illustrates a side cross sectional view of the exemplary mold, forming element, pressure element, and expansion device in a position for forming an exemplary flange from the composite material.

FIG. 3 illustrates a side cross sectional view of mold 22, forming element 24, pressure element 26, and first expansion device 28 in a position 112 for forming first flange 18 from composite material 14. First expansion device 28 is shown in an inflated state with substance 114 delivered into first expansion device 28 through the valve (not shown) to inflate first expansion device 28. In one embodiment, first expansion device 28 is inflated at a predetermined, controlled rate to facilitate minimizing and/or eliminating local laminate deformations (not shown) to second composite material 88. While inflated, first expansion device 28 is confined in space 68 by at least one of forming element 24, pressure element 26 and first positioner 32.

Support element 38 is configured to react to inflation of expansion device 28 and apply a force to resist movement of forming element 24. Similarly, fastener 70 is configured to react to inflation of expansion device 28 and apply a force to resist movement of pressure element 26. First expansion device 28 is configured to impart a forming force against the first portion 109 of fibers 103 of second composite material 88. More particularly, first expansion device 28 is configured to controllably bend fibers 103 about curvilinear end 84 to form first flange 18. In one embodiment, first flange 18 is formed having a first portion 116, a second portion 118, and an interface 120 therebetween. First portion 116 is positioned substantially orthogonal to second portion 118 and interface 120 includes a bend radius that is less than about 10 inches. In one embodiment, interface 120 includes bend radius between about 1 inch to about 5 inches. Alternatively, interface 120 may include a bend radius that is more than about 10 inches. Moreover, in one embodiment, interface 120 includes a bend radius that is between about 1 inch and about 5 inches. Further, in one embodiment, interface 120 includes a bend radius that is less than about 1 inch.

Figure 4:
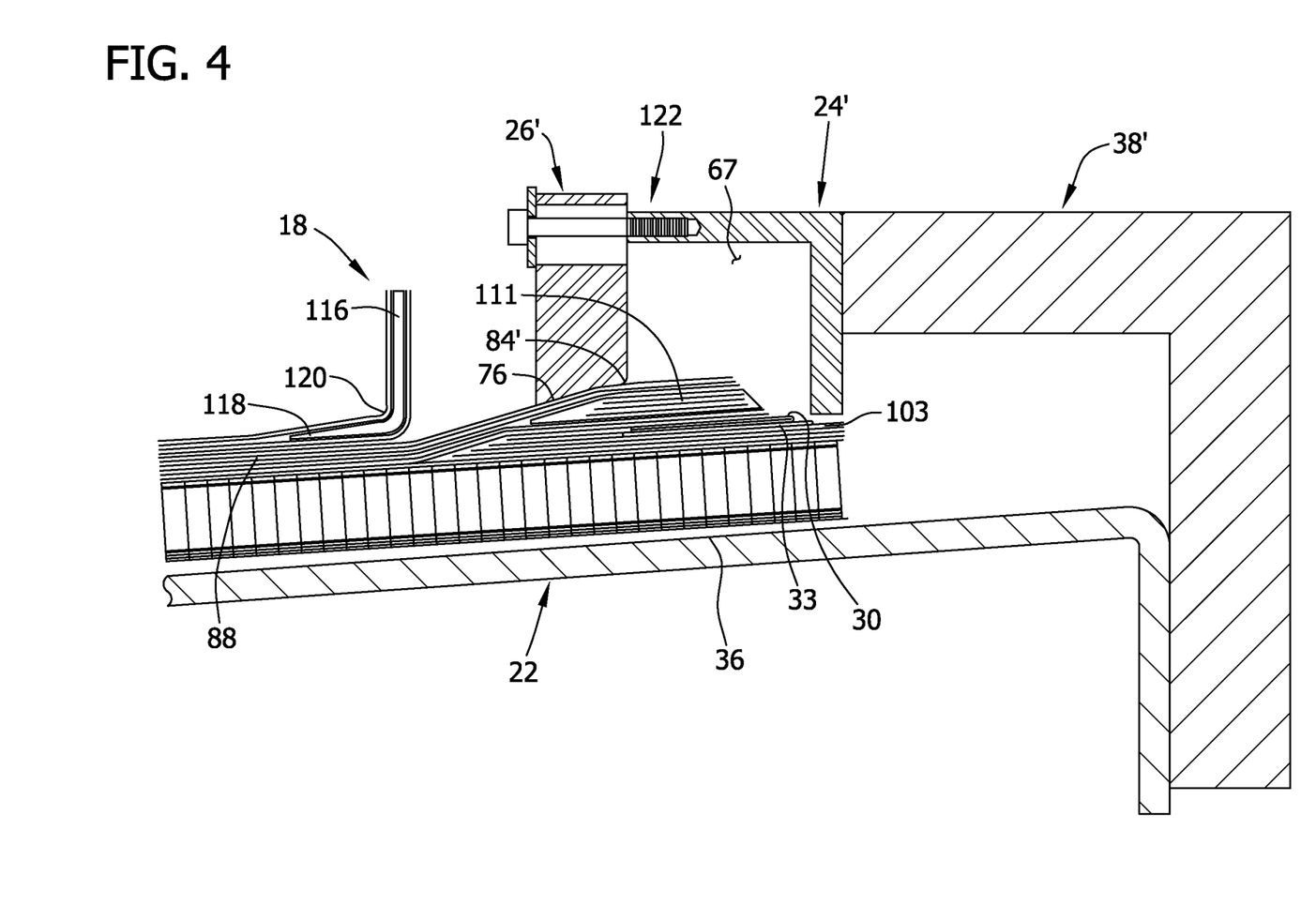
FIG. 4 illustrates a side cross sectional view of the exemplary mold, another forming element, another pressure element and another expansion device, and illustrates an exemplary formed flange.

FIG. 4 illustrates a side cross sectional view of mold 22, another forming element 24', another pressure element 26' and another support element 38' in another position 122 along mold 22 and illustrates first flange 18, with first expansion device 28 and first positioner 32 removed. Forming element 24', pressure element 26' and forming element 38' are similar to respective forming element 24, pressure element 26 and forming element 38 (shown in FIG. 1). In the exemplary embodiment, forming element 24', pressure element 26' and forming element 38' are sized differently than corresponding forming element 24, pressure 3element 26 and forming element 38 (shown in FIG. 1) to facilitate compensating for new position 122 along mold 22. More particularly, forming element 24, pressure element 26 and forming element 38 (shown in FIG. 1) are removed from mold 22 and forming element 24', pressure element 26' and forming element 38' are adjustably coupled to one another and to mold 22. Moreover, curved end 84' of pressure element 26' is also sized differently than corresponding curved end 84 (shown in FIG. 1). Alternatively, curved end 84' may be similarly sized as curved end 84 (shown in FIG. 1).

First flange 18 is shown as integrally formed from and coupled to second composite material 88. Forming element 24' and pressure element 26' are shown position 122 with respect to mandrel 36 and away from first flange 18. More particularly, second expansion device 30, positioner 33, and second portion 111 of fibers 103 are positioned within space 67. Moreover, bottom 76 and curvilinear end 84' of pressure element 26 are positioned to be in contact with fibers 103. Second expansion device 30, in a deflated position, positions second portion 111 of fibers 103 into space 67.

Figure 5:
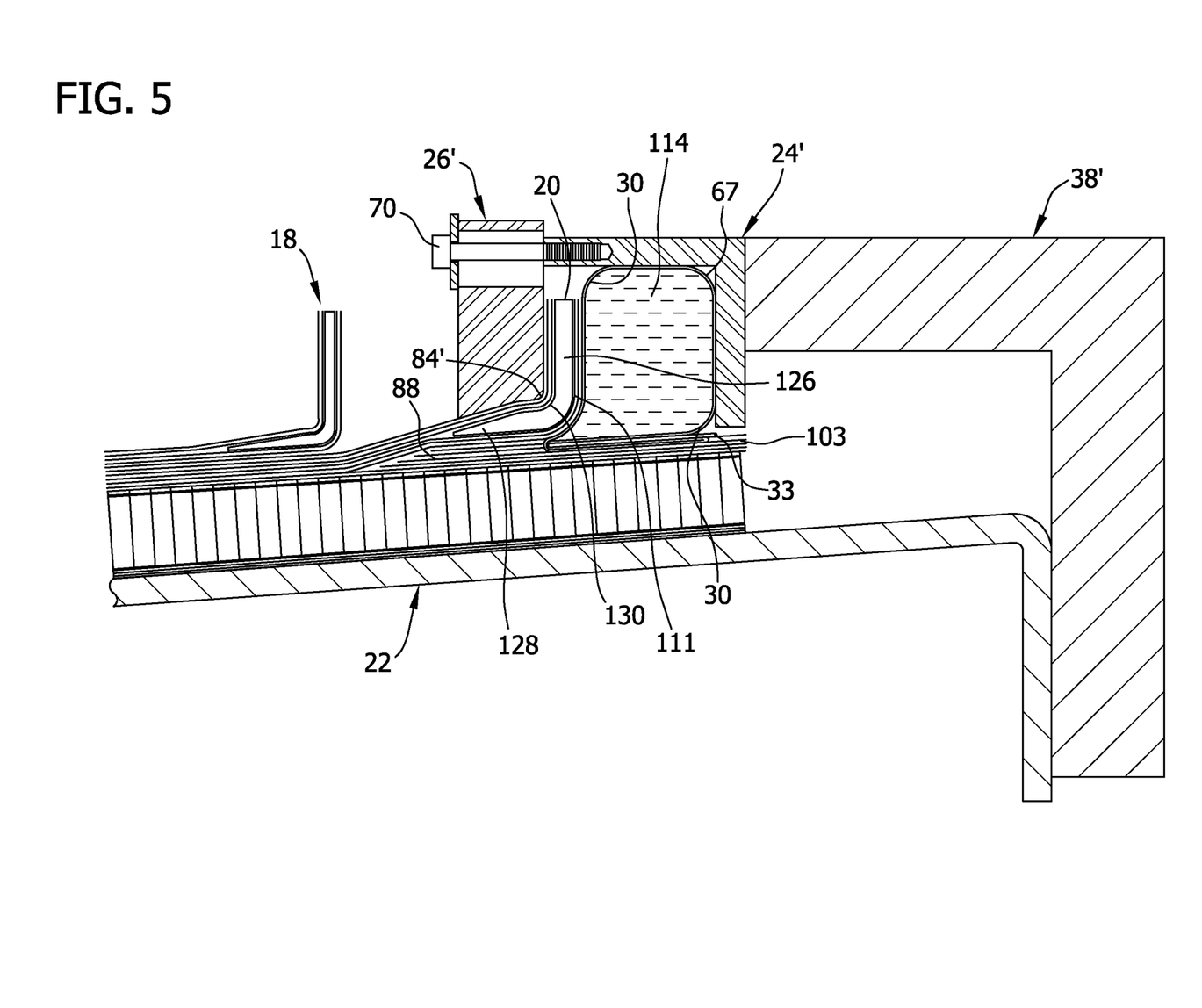
FIG. 5 illustrates a side cross sectional view of the exemplary mold, forming element, pressure element and expansion device shown in FIG. 4 for forming another exemplary flange from the composite material.

FIG. 5 illustrates a side cross sectional view of mold 22, forming element 24', pressure element 26' and support element 38' and second expansion device 30 for forming second flange 20 from composite material 88. Second expansion device 30 is shown in an inflated state with substance 114 delivered into second expansion device 30 through the valve (not shown) to inflate second expansion device 30. In one embodiment, second expansion device 30 is inflated at a predetermined controlled rate to facilitate minimizing and/or eliminating local laminate deformations (not shown) to second composite material 88. While inflated, second expansion device 30 is confined in space 67 by at least one of second positioner 33, forming element 24', pressure element 26' and support element 38'.

Support element 38' is configured to react to inflation of expansion device 30 and apply force to resist movement of forming element 24'. Similarly, fastener 70 is configured to react to inflation of expansion device 30 to apply a force to resist movement of pressure element 26'. Second expansion device 30 is configured to impart a forming force against second portion 111 of fibers 103. Expansion device 30 is configured to controllably bend second portion 111 of fibers 103 about curvilinear end 84' to facilitate forming second flange 20. More particularly, second flange 20 is formed having a first portion 126, a second portion 128, and an interface 130 therebetween. First portion 126 is positioned substantially orthogonal to second portion 128 and interface 130 includes a bend radius that is less than about 10 inches. In one embodiment, interface 130 includes a bend radius from about 1 inch to about 5 inches. Alternatively, interface 130 may include a bend radius that is more than about 10 inches. Moreover, in one embodiment, interface 130 includes a bend radius that is between about 1 inch and about 5 inches. Further, in one embodiment, interface 130 includes a bend radius that is less than about 1 inch.

Figure 6:
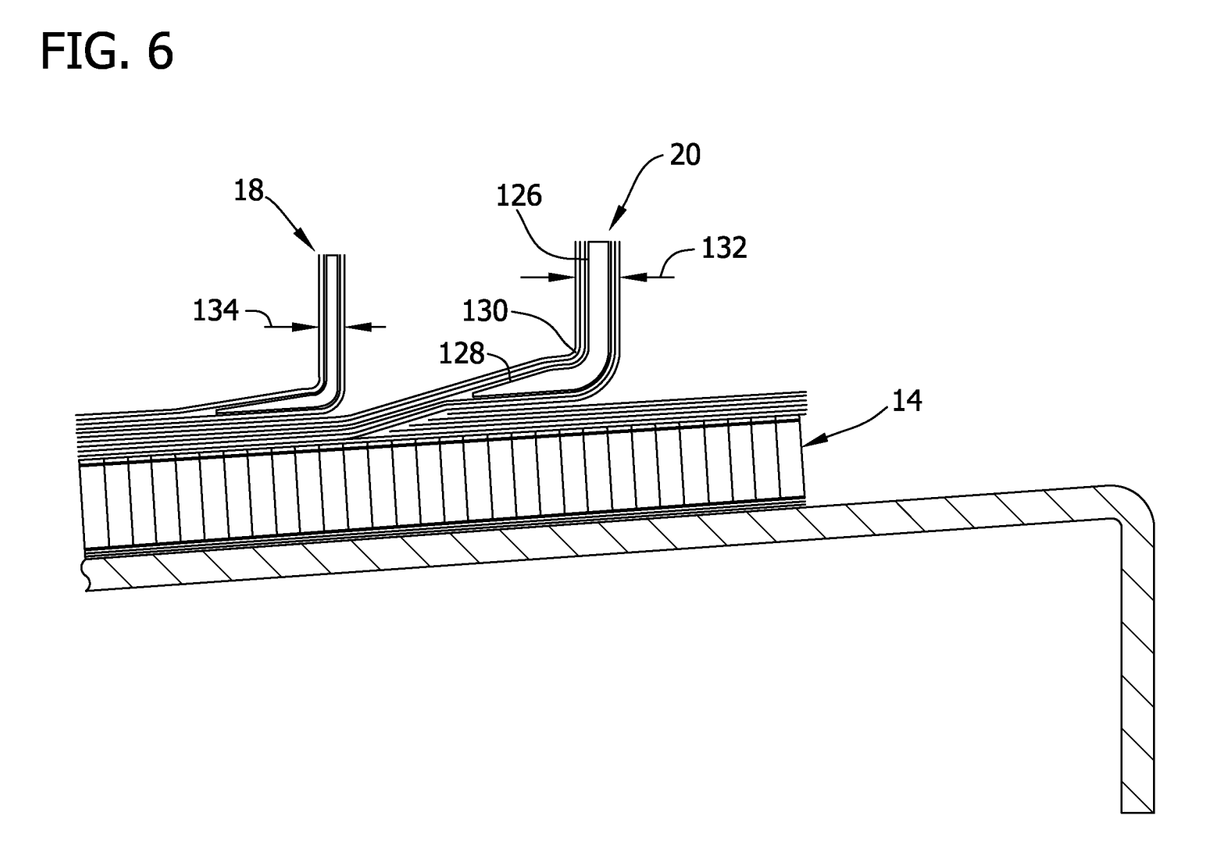
FIG. 6 illustrates a side cross sectional view of exemplary flanges formed from the composite material.

FIG. 6 illustrates a side cross sectional view of flanges 18 and 20 formed from composite material 14. In one embodiment, second flange 20 has a thickness 132 that is different than a thickness 134 of first flange 18. In the exemplary embodiment, thickness 132 is greater than thickness 134. Alternatively, second flange 20 has a thinner thickness or substantially the same thickness as first flange 18. Varying the thicknesses of flanges 18 and 20 facilitates in providing different physical properties to component 12 (shown in FIG. 1).

Figure 7A:
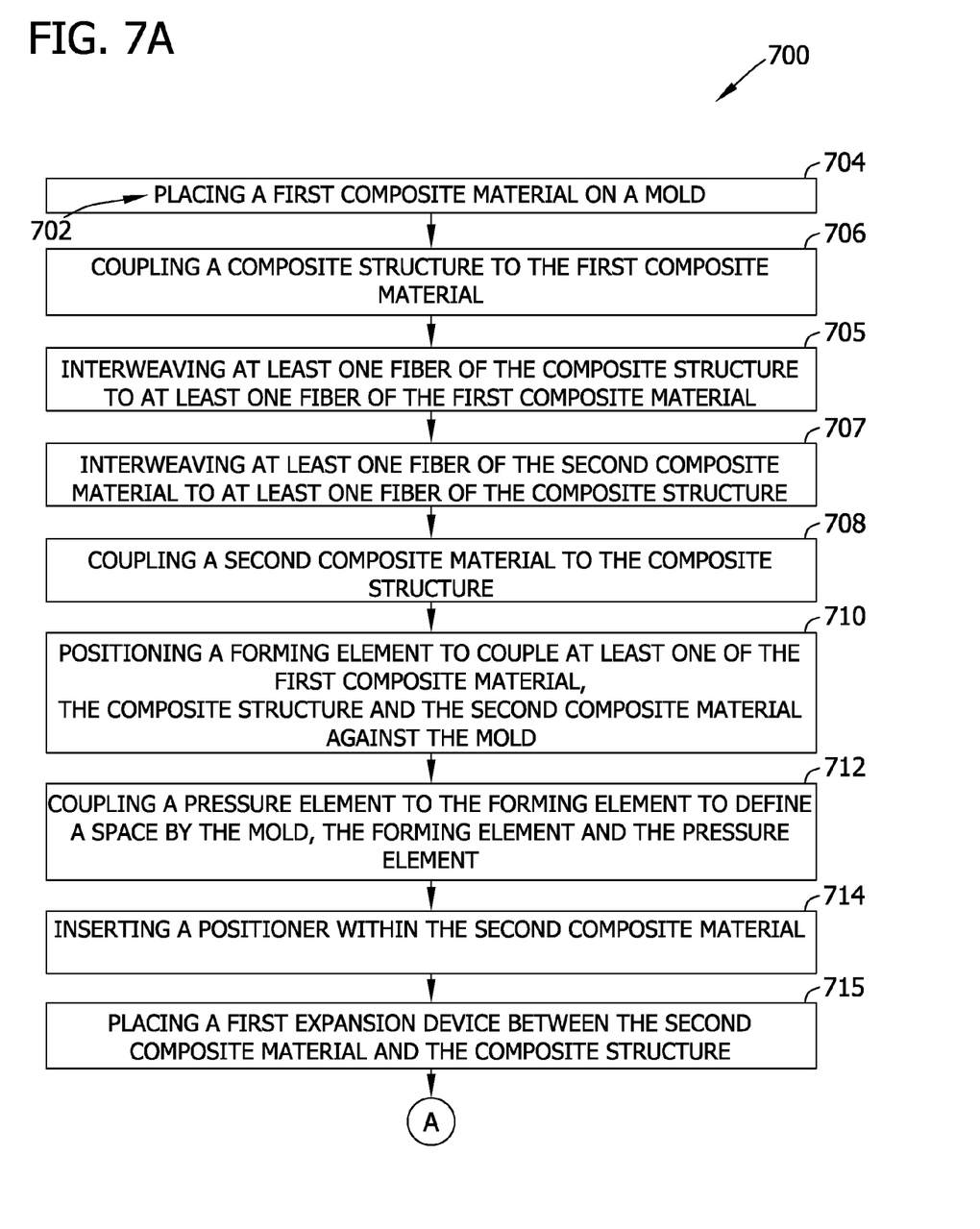
FIG. 7 illustrates an exemplary flowchart illustrating a method of manufacturing a flanged component.
Figure 7B:
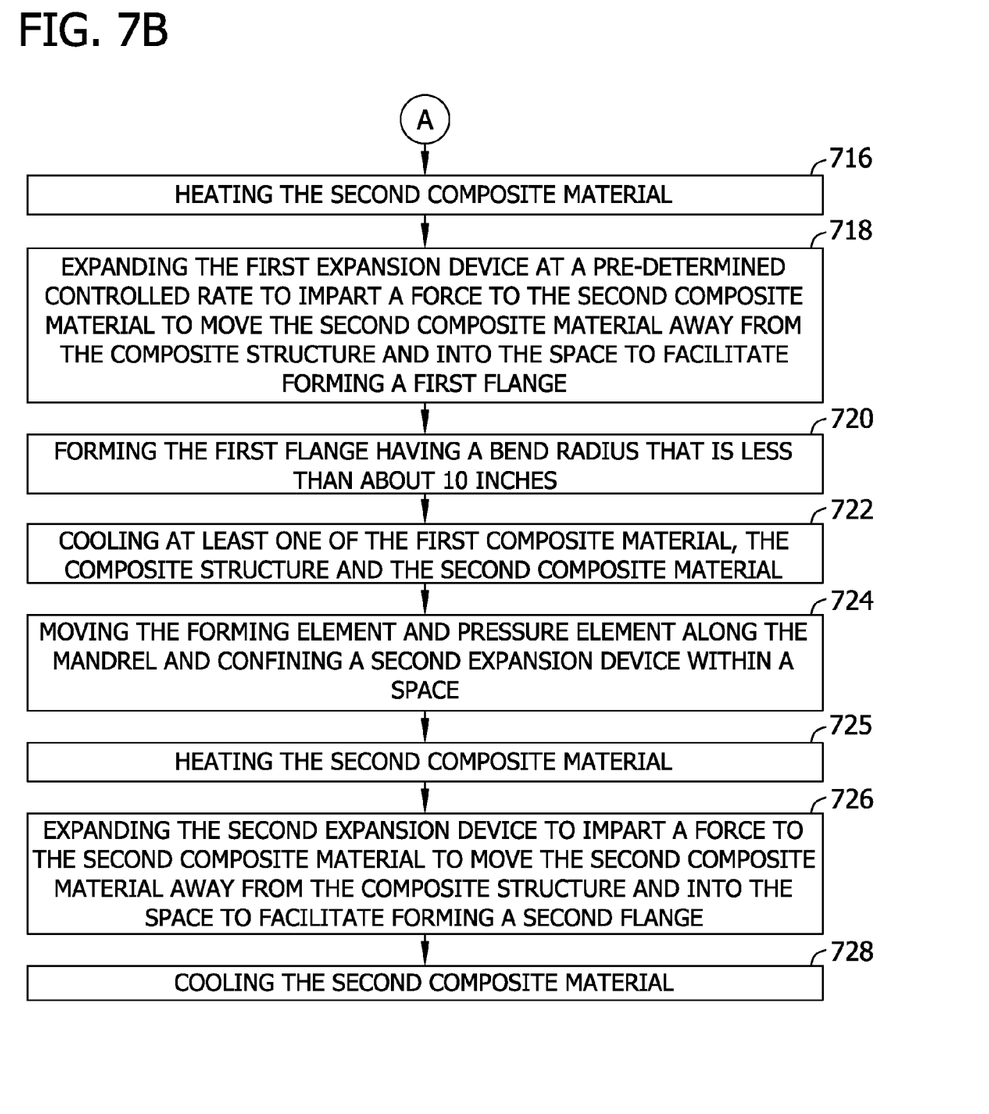

FIG. 7 is an exemplary flowchart 700 illustrating a method 702 of manufacturing a flanged composite component, for example component 12 (shown in FIG. 2). Method 702 includes placing 704 a first composite material, such as first composite material 86 (shown in FIG. 1), on a mold, for example mold 22 (shown in FIG. 1). A composite structure, such as composite structure 90 (shown in FIG. 1), is coupled 706 to the first composite material. Method 702 includes coupling 708 a second composite material, for example second composite material 88 (shown in FIG. 1), to the composite structure. In one embodiment, coupling the composite structure to the first composite material includes interweaving 705 at least one fiber of the composite structure to at least one fiber of the first composite material and coupling the second composite material to the composite structure includes interweaving 707 at least one fiber of the second composite material to at least one fiber of the composite structure.

Method 702 further includes positioning 710 a forming element, for example forming element 24 (shown in FIG. 1), to hold at least one of the first composite material, the composite structure and the second composite material. A pressure element, such as pressure element 26 (shown in FIG. 1), is coupled 712 to the forming element to define a space, for example space 68 (shown in FIG. 1), among at least the mold, the forming element, and the pressure element. Method 702 also includes inserting 714 a positioner, for example first positioner 32 (shown in FIG. 1), within the second composite material. In addition, method 702 includes placing 715 a first expansion device, for example first expansion device 28 (shown in FIG. 1), within the second composite material. The first positioner 32 is placed in contact with the first expansion device.

Method 702 further includes heating 716 the second composite material, for example second composite material 88. In the exemplary method 702, heating 716 the second composite material includes directing forced hot air toward second composite material. More particularly, forced hot air is directed to outer fibers, such as fiber portion 111 of second composite material. Heating 716 may include any type of heat addition to enable apparatus to function as described herein. Alternatively, heating 716 may include heating first composite material and/or composite structure. The first expansion device is controllably expanded 718 at a predetermined rate to impart a force to the second composite material to move the second composite material away from the composite structure and into the space to facilitate forming a first flange, such as first flange 18 (shown in FIG. 1). Method 702 also includes forming 720 the first flange having a bend radius that is less than about 10 inches. Alternatively, method 702 may include manufacturing a bend radius for the first flange that is more than about 10 inches. Moreover, method 702 includes manufacturing a bend radius that is between about 1 inch and about 5 inches. Method 702, in one embodiment, includes manufacturing a bend radius that is less than about 1 one. Method 702 includes cooling 722 the second composite material, for example second composite material 88. In the exemplary method 702, cooling 722 the second composite material includes directing forced air toward second composite material. More particularly, forced hot air is directed to outer fibers, such as outer fibers 107 of second composite material. Cooling 722 may include any type of heat removal to enable apparatus to function as described herein. Alternatively, cooling 722 may include cooling first composite material and/or composite structure.

Method 702 further includes moving 724 the forming element and the pressure element along the mandrel. A second expansion device, such as second expansion device 30 (shown in FIG. 1), is confined within a space, for example space 67 (shown in FIG. 4). Method 702 includes heating 725 the second composite material, for example second composite material 88 (shown in FIG. 5). Moreover, method 702 includes heating a second portion of the fibers of the second composite m material, for example second portion 111 of fibers 103 (shown in FIG. 5). Method 702 includes expanding 726 the second expansion device to impart a force to the second composite material to move the second composite material away from the composite structure and into the space to facilitate forming a second flange, such as second flange 20 (shown in FIG. 1). Method 702 also includes forming the second flange having a bend radius that is less than about 10 inches. Alternatively, method 702 may include manufacturing a bend radius for the second flange that is more than about 10 inches. Method 702 includes cooling 728 the second composite material after expanding the second expansion device. Alternatively, method 702 may include cooling the first composite material and/or the composite structure.

A technical effect of the systems and methods described herein includes at least one of: a method of manufacturing a flanged composite component from a first composite material, a second composite material, and a composite structure; a flanged composite component; and an apparatus for manufacturing a flanged composite component.

Exemplary embodiments of an apparatus and methods for manufacturing flanged composite components are described above in detail. The methods and systems are not limited to the specific embodiments described herein, but rather, components of systems and/or steps of the methods may be utilized independently and separately from other components and/or steps described herein. For example, the methods may also be used in combination with other manufacturing systems and methods, and are not limited to practice with only the systems and methods as described herein. Rather, the exemplary embodiment can be implemented and utilized in connection with many other component formation applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of manufacturing a flanged composite component, the method comprising:
    coupling a composite structure to a first composite material;
    coupling a second composite material to the composite structure;
    placing a first expansion device within the second composite material;
    coupling a forming element to the second composite material against a mold;
    coupling a pressure element to the forming element to define a space among a mandrel of the mold, the forming element and the pressure element; and expanding the first expansion device to impart a force to the second composite material to move the second composite material away from the composite structure and into the space to facilitate forming, a first flange.

2. The method of claim 1, further comprising inserting a positioner within the second composite material and in contact with the first expansion device.

3. The method of claim 1, further comprising, heating, the second composite material prior to inflating the first expansion device.

4. The method of claim 1, further comprising cooling the second composite material after inflating the first expansion device.

5. The method of claim 1, wherein coupling the composite structure to the first composite material comprises interweaving at least one fiber of the composite structure to at least one fiber of the first composite material.

6. The method of claim 1, wherein coupling the second composite material to the composite structure comprises interweaving at least one fiber of the second composite material to at least one fiber of the composite structure.

7. The method of claim 1, wherein the first expansion device comprises a bladder and expanding the first expansion device comprises inflating the bladder.

8. The method of claim 1, wherein imparting the force to the first flange comprises forming the first flange having a bend radius that is less than about 10 inches.

9. The method of claim 8, wherein forming the first flange having a bend radius that is less than about 10 inches comprises bending the second composite material on a curvilinear end of the pressure element.

10. The method of claim 1, further comprising moving the forming element and the pressure element along the mandrel and confining a second expansion device coupled to the second composite material.

11. The method of claim 10, further comprising expanding the second expansion device to impart a force to the second composite material to move the second composite material away from the composite structure to facilitate forming a second flange.

12. The method of claim 1, wherein the composite structure comprises a first layer of fibers, a second layer of fibers, and a honeycomb structure between the first and second layers of fibers.

13. The method of claim 12, wherein the first composite material comprises a first plurality of fibers coupled to the composite structure on a first side opposite the space and the second composite material comprises a second plurality of fibers coupled to the composite structure on a second side adjacent the space.

14. The method of claim 13, wherein the second plurality of fibers is larger than the first plurality of fibers.

15. The method of claim 14, wherein a thickness of the second composite material is greater than a thickness of the first composite material.

16. The method of claim 13, wherein the first plurality of fibers are formed of a different material than the second plurality of fibers.

17. The method of claim 1, wherein the first and second composite material comprise a matrix material and a reinforcement material.

18. The method of claim 17, wherein the matrix material comprises polyester resin, acrylic resin, vinyl ester resin, epoxy resin, polyurethane resin, phenolic resin, polyamide resin, and/or mixtures thereof.

19. The method of claim 17, wherein the reinforcement material comprises glass fiber, graphite fiber, carbon fiber, ceramic fiber, aromatic polyamide fiber, and/or mixtures thereof.

20. The method of claim 1, wherein the composite structure extends away from the mandrel toward the space.

* * * * *